(12) United States Patent
Noda

(10) Patent No.: US 6,734,977 B2
(45) Date of Patent: May 11, 2004

(54) METHOD AND APPARATUS FOR MEASURING GAP, AND METHOD AND APPARATUS FOR MEASURING SHAPE AND METHOD FOR MANUFACTURING LIQUID CRYSTAL DEVICE

(75) Inventor: Masaaki Noda, Suwa (JP)

(73) Assignee: Seiko Epson Corporation (JP)

( * ) Notice: Subject to any disclaimer, the term of this patent is extended or adjusted under 35 U.S.C. 154(b) by 191 days.

(21) Appl. No.: 10/004,354

(22) Filed: Oct. 31, 2001

(65) Prior Publication Data

US 2002/0089672 A1 Jul. 11, 2002

(51) Int. Cl.[7] ............................ G03B 9/02; G02F 1/1341

(52) U.S. Cl. ........................................ 356/504; 349/184

(58) Field of Search ................................ 356/504, 505, 356/630, 632; 349/189, 192, 187

(56) References Cited

U.S. PATENT DOCUMENTS

2001/0026348 A1 * 10/2001 Murata et al. .............. 349/187

* cited by examiner

*Primary Examiner*—Frank G. Font
*Assistant Examiner*—Patrick Connolly
(74) *Attorney, Agent, or Firm*—Harness, Dickey & Pierce, P.L.C.

(57) ABSTRACT

The present invention provides an apparatus comprising a wavelength variable light source for shifting a wavelength of light stepwise within a predetermined range and applying the light with the shifted wavelength onto a light transmissible object that is to be measured and is provided with a gap; a camera for taking an image of an interference fringe formed by the light transmitted by said object, correspondingly to each step of the shifted wavelength; an image memory for storing images taken by said camera; and means for obtaining a change in the intensity of the images taken by said camera, at each of predetermined positions of each image over said predetermined wavelength range; and means for determining gap values of a plurality of points of the gap based on the obtained changes in the intensity.

43 Claims, 16 Drawing Sheets

METHOD AND APPARATUS FOR MEASURING GAP, AND METHOD AND APPARATUS FOR MEASURING SHAPE AND METHOD FOR MANUFACTURING LIQUID CRYSTAL DEVICE

CROSS REFERENCE TO RELATED APPLICATIONS

The present application claims priority under 35 U.S.C. §119 to Japanese Patent Application No. 2001-323731, filed on Oct. 22, 2001, entitled "METHOD AND APPARATUS FOR MEASURING GAP, METHOD AND APPARATUS FOR MEASURING SHAPE AND METHOD FOR MANUFACTURING LIQUID CRYSTAL DEVICE". The contents of that application are incorporated herein by reference in their entirely.

BACKGROUND OF THE INVENTION

1. Field of the Invention

The present invention relates to technology for measuring a gap between members or shape thereof by utilizing interference of light.

2. Description of the Related Art

For example, a conventional gap measuring apparatus having a configuration shown in FIG. 20 has been developed as an apparatus for measuring a gap between light transmission members, such as liquid crystal cells. This apparatus utilizes a phenomenon that light waves respectively reflected by the top surface and the bottom surface of a gap having an effective thickness d (incidentally, the refractive index of a medium is assumed to be n) illuminated by light, which is irradiated from an objective lens of a microscope through a half-mirror, return thereto in such a way as to cause a phase difference 2nd therebetween, and that these light waves pass through a Wollaston prism and polarizing plates A and P to thereby generate interference fringes. That is, the value of the gap d is determined by measuring the peak gap y between an interference fringe, which is generated by the interference between light waves both reflected by one of the top and bottom surfaces, and another interference fringe, which is generated on the line of intersection between the wavefronts of light waves respectively reflected by the top and bottom surfaces, according to the following equation (1):

$$y = nd/(\zeta_e - n_o) \tan \theta \tag{1}$$

where ζ designates a prism angle of a Wollaston prism, and $n_e$ and $n_o$ denote refractive indexes of the Wollaston prism.

However, the conventional gap measuring apparatus is operative to measure the gap therebetween correspondingly to one point of an object at a time. Thus, to measure the distribution of the gaps in a predetermined section, the conventional gap measuring apparatus should repeatedly perform the measurement of the gap by shifting the object therein. Thus, an operation of measuring the gap is complex and time-consuming.

SUMMARY OF THE INVENTION

The invention is accomplished taking the aforementioned problem into consideration.

Accordingly, an object of the invention is to provide a method and apparatus each enabled to measure the gap or shape of an object at a high speed with high accuracy and a method for effectively manufacturing a liquid crystal device.

To achieve the foregoing object, the present invention adopts the following structures.

(1) A gap measuring method comprising the steps of:
  shifting a wavelength of light stepwise within a predetermined wavelength range to use the light for measuring a gap;
  taking an image of an interference fringe, which is generated owing to a gap provided in a measured object and the used light with the shifted wavelength, by a camera correspondingly to each step of the shifted wavelength;
  obtaining a change in the intensity of the images of the interference fringes taken by said camera at each of predetermined positions of each image, over said predetermined wavelength range; and
  determining gap values of a plurality of points of the gap based on the obtained changes in the density.

(2) A gap measuring method according to (1), wherein said step of determining a gap value includes the steps of:
  obtaining a theoretical change in the intensity of the images, over said predetermined wavelength range, correspondingly to each of preliminarily set gap values; and
  determining the gap value of said measured object based on the change in the intensity of the fixed position of each image taken by the camera and the obtained theoretical changes in the intensity.

(3) A gap measuring method according to (1), wherein said step of determining a gap value includes the steps of:
  obtaining a plurality of peaks in said change in the intensity of the images, over the predetermined wavelength range; and calculating gap values of a plurality of points of the measured object based on a plurality of wavelengths respectively corresponding to the peaks.

(4) A gap measuring method according to any one of (1)–(3), wherein said interference fringe is obtained by utilizing light transmitted by said measured object.

(5) A gap measuring method according to any one of (1)–(3), wherein said interference fringe is obtained by utilizing light reflected from said measured object.

(6) A gap measuring method according to any one of (1)–(5), wherein said shifted wavelength of the used light is obtained by shifting a wavelength of light emitted from a light source to said measured object.

(7) A gap measuring method according to any one of (1)–(5), wherein said shifted wavelength of the used light is obtained by providing a filter, which is adapted to selectively transmit a certain wavelength of light to the side of said camera.

(8) A gap measuring method according to any one of (1)–(7), wherein said change in the density of images taken by the camera, is corrected in consideration of variable factors.

(9) A gap measuring method according to any one of (1)–(8), wherein the said image consists of a plurality of pixels, to measure the gap value for each of the pixels.

(10) A shape measuring method comprising the steps of:
  measuring gap values of a gap between a pair of members, one of which has a flat surface, by the gap measuring method according to any one of (1)–(9); and
  determining a shape of the other member constituting said gap, based on the measured gap values.

(11) A gap measuring apparatus comprising:
  a wavelength variable light source for shifting a wavelength of light stepwise within a predetermined range and applying the light with the shifted wavelength onto a light transmissible object that is to be measured and is provided with a gap;

a camera for taking an image of an interference fringe formed by the light transmitted by said object, correspondingly to each step of the shifted wavelength;

an image memory for storing images taken by said camera; and means for obtaining a change in the intensity of the images taken by said camera, at each of predetermined positions of each image over said predetermined wavelength range; and means for determining gap values of a plurality of points of the gap based on the obtained changes in the intensity.

(12) A gap measuring apparatus comprising:

a white light source for applying white light onto a light transmissible object that is to be measured and is provided with a gap;

a filter for shifting, stepwise, a wavelength of the light transmitted by said measured object within a predetermined wavelength range to send the light with the shifted wavelength to said camera;

a camera for taking an image of an interference fringe formed by said light transmitted by the filter, correspondingly to each step of the shifted wavelength;

an image memory for storing images taken by said camera;

means for obtaining a change in the intensity of the images taken by said camera, at each of predetermined positions of each image over said predetermined wavelength range; and means for determining gap values of a plurality of points of the gap based on the obtained changes in the intensity.

(13) A gap measuring apparatus comprising:

a wavelength variable light source for shifting a wavelength of light stepwise within a predetermined range and emitting the light with the shifted wavelength;

a camera for taking an image of an interference fringe of light;

optical means for directing the light emitted from said light source to a measured object provided with a gap and directing the light reflected by said measured object to said camera;

an image memory for storing images of interference fringes formed by the light from said optical means and taken by said camera; and means for obtaining a change in the intensity of the images taken by said camera, at each of predetermined positions of each image over said predetermined range; and means for determining gap values of a plurality of points of the gap based on the obtained changes in the intensity.

(14) A gap measuring apparatus comprising:

a white light source for emitting white light;

a camera for taking an image of an interference fringe of light;

optical means for directing the light emitted from said light source to a measured object provided with a gap and directing the light reflected by said measured object to said camera;

a filter for shifting, stepwise, a wavelength of the light from said optical means within a predetermined range to send the light with the shifted wavelength to said camera;

an image memory for storing images of interference fringes formed by the light from said optical means and taken by said camera; and means for obtaining a change in the intensity of the images taken by said camera at each of predetermined positions of each image, over said predetermined wavelength range; and means for determining gap values of a plurality of points of the gap based on the obtained changes in the intensity.

(15) A gap measuring apparatus according to any one of (11)–(14), wherein said means for determining a gap value includes:

a reference data memory for storing data representing a theoretical change in the intensity of the images, over said predetermined range, correspondingly to each of preliminarily set gap values; and gap value comparison and determination means for determining gap values of a plurality of points of gap based on the changes in the intensity the images and the theoretical changes in the intensity.

(16) A gap measuring apparatus according to any one of (11)–(14), wherein said means for determining the gap values includes:

means for obtaining a plurality of peaks in said change in the intensity of the images, over the predetermined wavelength range; and means for calculating gap values of a plurality of points of the gap based on a plurality of wavelengths respectively corresponding to the peaks.

(17) A gap measuring apparatus according to any one of (11)–(16), which further comprises correction means for correcting the change in the density of the images taken by the camera, in consideration of variable factors.

(18) A shape measuring apparatus comprising:

a wavelength variable light source for shifting a wavelength of light stepwise within a predetermined range and irradiating the light with the shifted wavelength onto a light transmissible object that is to be measured;

a light transmissible plate-like element which has a flat surface and is oppositely placed to said object with intervention of a gap;

a camera for taking an image of an interference fringe formed by the light with the shifted wavelength transmitted by said object and said plate-like element, correspondingly to each step of the shifted wavelength;

an image memory for storing images taken by said camera;

means for obtaining a change in the intensity of the images taken by said camera at each of predetermined positions of each image, over said predetermined range; means for determining gap values of a plurality of points of the gap based on the obtained changes in the intensity; and gap-value-to-shape conversion means for determining a shape of said object based on the determined gap values.

(19) A shape measuring apparatus comprising:

a white light source for emitting white light onto a light transmissible object that is to be measured;

a light transmissible plate-like element which has a flat surface and is oppositely placed to said object with intervention of a gap;

a filter for shifting, stepwise, wavelength of the light transmitted by the object and the plate-like element within a predetermined range to send the light with the shifted wavelength to said camera;

a camera for taking an image of an interference fringe formed by said light transmitted by said filter, correspondingly to each step of the shifted wavelength;

an image memory for storing images taken by said camera;

means for obtaining a change in the intensity of the images taken by said camera, at each of predetermined positions of each image over said predetermined wavelength range; means for determining gap values of a plurality of points of the gap based on the obtained changes in the intensity; and gap-value-to-shape conversion means for determining a shape of said object based on the determined gap values.

(20) A shape measuring apparatus comprising:

a wavelength variable light source for shifting a wavelength of light stepwise within a predetermined range and emitting the light with the shifted wavelength onto an object to be measured;

a light transmissible plate-like element which has a flat surface and is oppositely placed to said object with intervention of a gap;

a camera for taking an image of an interference fringe of light;

optical means for directing the light emitted from said light source to an object to be measured and directing the light reflected by said object and said plate-like element to said camera;

an image memory for storing images of interference fringes formed by the light from said optical means and taken by said camera;

means for obtaining a change in the intensity of the images taken by said camera, at each of predetermined positions of each image over said predetermined wavelength range; means for determining gap values of a plurality of points of the gap based on the obtained changes in the intensity; and gap-value-to-shape conversion means for determining a shape of said object based on the determined gap values.

(21) A shape measuring apparatus comprising:

a white light source for emitting white light onto an object that is to be measured;

a light transmissible plate-like element which has a flat surface and is oppositely placed to said object with intervention of a gap;

a camera for taking an image of an interference fringe of light;

optical means for directing the light emitted from said light source to the object and directing the light reflected by said object and said plate-like element to said camera;

a filter for shifting, stepwise, wavelength of light transmitted from said optical means within a predetermined range to send the light with the shifted wavelength to said camera;

an image memory for storing images of interference fringes formed by the light from said filter and taken by said camera;

means for obtaining a change in the intensity of the images taken by said camera, at each of predetermined positions of each image over said predetermined wavelength range; means for determining gap values of a plurality of points of the gap based on the obtained changes in the intensity; and gap-value-to-shape conversion means for determining a shape of said object based on the determined gap values.

(22) A shape measuring apparatus according to any one of (18)~(21), wherein said means for determining a gap value includes:

a reference data memory for storing data representing a theoretical change in the intensity of the images, over said predetermined range, correspondingly to each of preliminarily set gap values; and gap value comparison and determination means for determining gap values of a plurality of points of the gap based on the changes in intensity of the images and the theoretical changes in the intensity.

(23) A shape measuring apparatus according to any one of (18)~(21), wherein said means for determining the gap values includes:

means for obtaining a plurality of peaks in said change in the intensity of the images, over the predetermined wavelength range; and means for calculating gap values of a plurality of the gap based on a plurality of wavelengths respectively corresponding to the peaks.

(24) A shape measuring apparatus according to any one of (18)~(23), which further comprises correction means for correcting the change in the intensity of the images taken by the camera, in consideration of variable factors.

(25) A manufacturing method for a liquid crystal device, in which a gap between two substrates is filled with liquid crystal and sealed, wherein gap values of a plurality of points of the gap is measured by utilizing said gap measuring apparatus according to any one of (11)~(17), and wherein liquid crystal is injected into said gap when the gap values are within a prescribed range.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

(1) Configuration of Optical System for Obtaining Image Data of Interference Fringe

First Example

Figure 1:
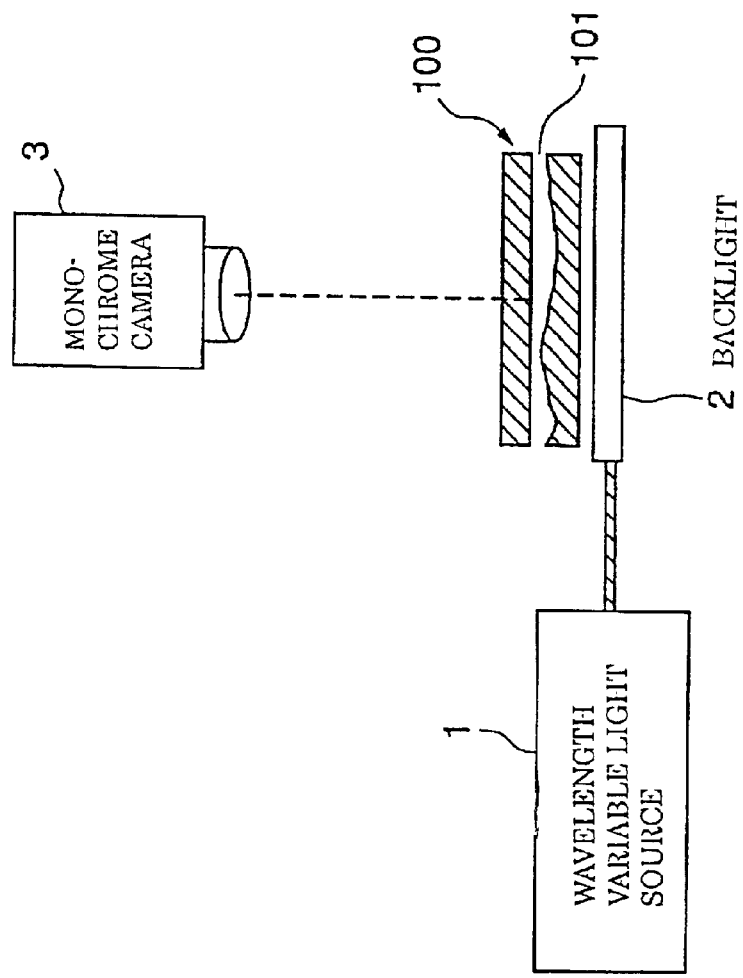
FIG. 1 is a diagram illustrating the configuration of a first optical system for obtaining a monochrome image of an interference fringe according to a mode for carrying out the invention.

FIG. 1 is a diagram illustrating the configuration of a first optical system for obtaining an image of an interference fringe according to a mode for carrying out the invention. This system employs a wavelength variable light source 1 enabled to perform wavelength scanning or wavelength shifting at every nanometer within a predetermined range of wavelength from, for example, 450 nm to 550 nm. Light outputted from the wavelength variable light source 1 is applied through a backlight 2 onto an object 100 to be measured. Then, the light is transmitted by the object 100. Subsequently, an image of interference fringes generated due to a gap 101 provided in the object 100 is taken by a monochrome camera 3. Therefore, in this case, image data respectively corresponding to 100 wavelengths are obtained.

Incidentally, a monochrome light source provided with a spectroscope enabled to perform wavelength scanning within a range of wavelength from 250 nm to 1200 nm is currently available. Thus, such a monochrome light source can be used as the wavelength variable light source 1.

Second Example

Figure 2:
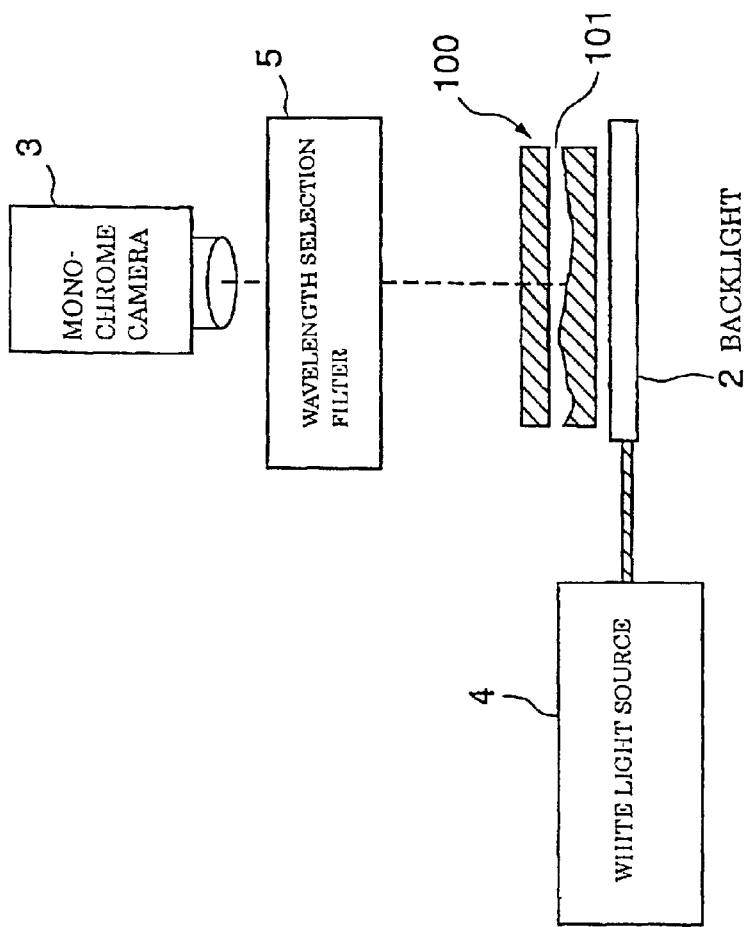
FIG. 2 is a diagram illustrating the configuration of a second optical system for obtaining a monochrome image of an interference fringe according to a mode for carrying out the invention.

FIG. 2 is a diagram illustrating the configuration of a second optical system for obtaining an image of an interference fringe according to a mode for carrying out the invention. In this example, light outputted from a white light source 4 is applied through a backlight 2 onto an object 100 to be measured. Then, the light is transmitted by the object 100. Subsequently, an image of interference fringes generated due to a gap 101 provided in the object 100 is taken by a monochrome camera 3. Therefore, in this case, image data of 100 wavelengths is obtained. In this system, a wavelength selection filter 5 enabled to perform wavelength scanning at every nanometer within a predetermined range of wavelength from, for instance, 450 nm to 550 nm is provided at the side of the monochrome camera 3. Further, an image of interference fringes is taken at every scanned wavelength of light transmitted by the wave selection filter 5. In this case, similarly, image data respectively corresponding to 100 wavelengths are obtained. Incidentally, the wavelength selection filter 5 may be provided in the monochrome camera 3.

Third Example

Figure 3:
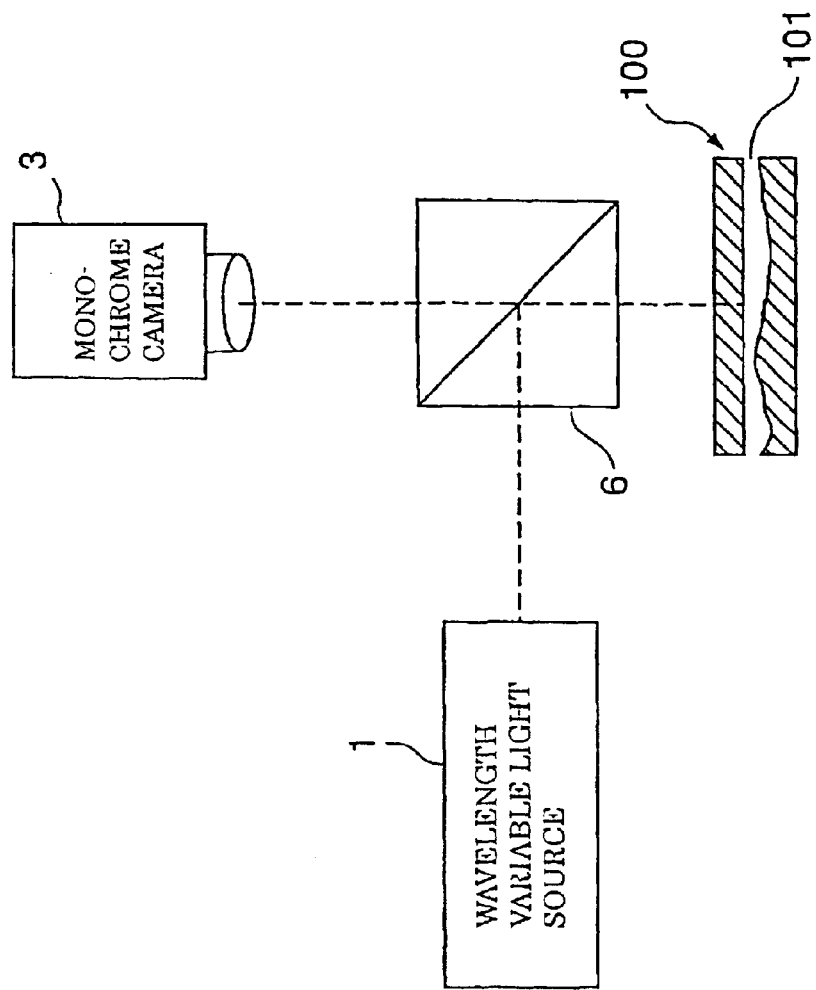
FIG. 3 is a diagram illustrating the configuration of a third optical system for obtaining a monochrome image of an interference fringe according to a mode for carrying out the invention.

FIG. 3 is a diagram illustrating the configuration of a third optical system for obtaining an image of an interference fringe according to a mode for carrying out the invention. This system employs a wavelength variable light source 1 enabled to perform wavelength scanning at every nanometer within a predetermined range of wavelength from, for example, 450 nm to 550 nm. Light outputted from the wavelength variable light source 1 is reflected by a beam splitter 6 to an object 100 to be measured. Then, the light is reflected again by the object 100. Subsequently, the reflected light is transmitted by the beam splitter 6. An image formed from the transmitted light is taken by a monochrome camera 3. Thus, an image of the interference fringes generated owing to a gap 101, which is provided in the object 100, is taken. In this case, similarly, image data respectively corresponding to 100 wavelengths are obtained.

Fourth Example

Figure 4:
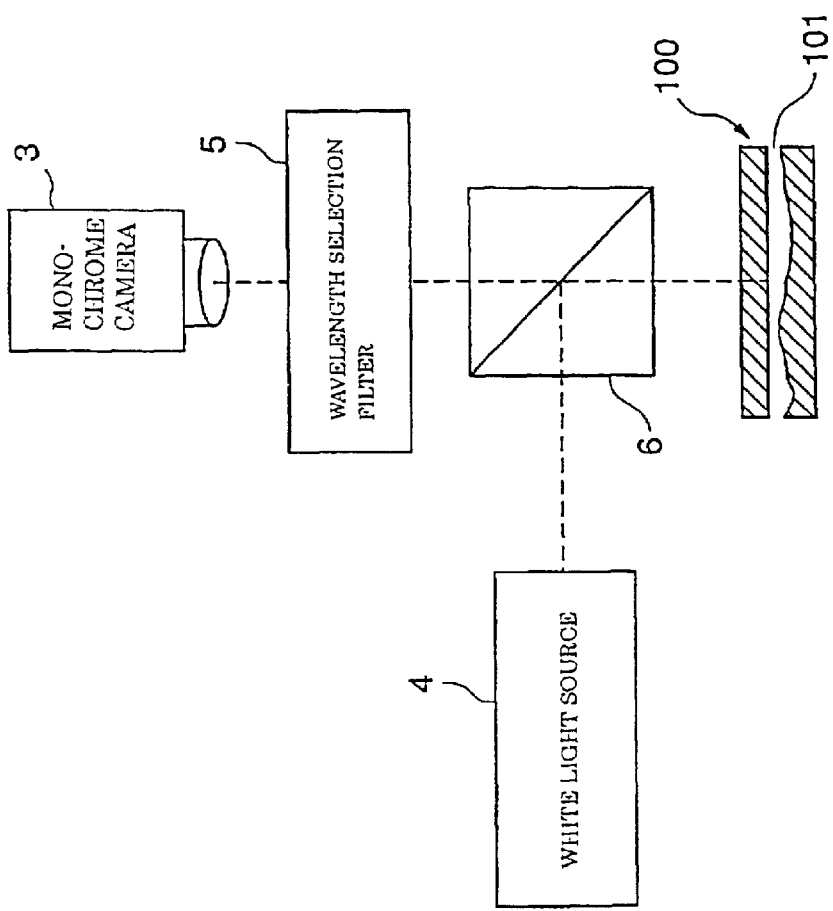
FIG. 4 is a diagram illustrating the configuration of a fourth optical system for obtaining a monochrome image of an interference fringe according to a mode for carrying out the invention.

FIG. 4 is a diagram illustrating the configuration of a fourth optical system for obtaining an image of an interference fringe according to a mode for carrying out the invention. This system employs a white light source 4. Light outputted from the white light source 4 is reflected by a beam splitter 6 to an object 100 to be measured. Then, the light is reflected again by the object 100. Subsequently, the reflected light is transmitted by the beam splitter 6. An image formed from the transmitted light is taken by a monochrome camera 3. Thus, an image of the interference fringes generated owing to a gap 101, which is provided in the object 100, is taken. In this system, a wavelength selection filter 5 enabled to perform wavelength scanning at every nanometer within a predetermined range of wavelength from, for instance, 450 nm to 550 nm is provided at the side of the monochrome camera 3. Further, an image of interference fringes is taken at every scanned wavelength of light transmitted by the wave selection filter 5. In this case, similarly, image data respectively corresponding to 100 wavelengths are obtained. Incidentally, the wavelength selection filter 5 may be provided in the monochrome camera 3.

In the case of the third and fourth examples, the system may be adapted so that light outputted from the light source is transmitted by the beam splitter 6 toward the object 100, that then, the light is reflected by the object 100, that subsequently, the light is reflected again by the beam splitter 6, and that an image formed from this reflected light is taken by the monochrome camera 3.

(2) Gap Measuring Apparatus of the Invention

First Embodiment (i) Configuration

Figure 5:
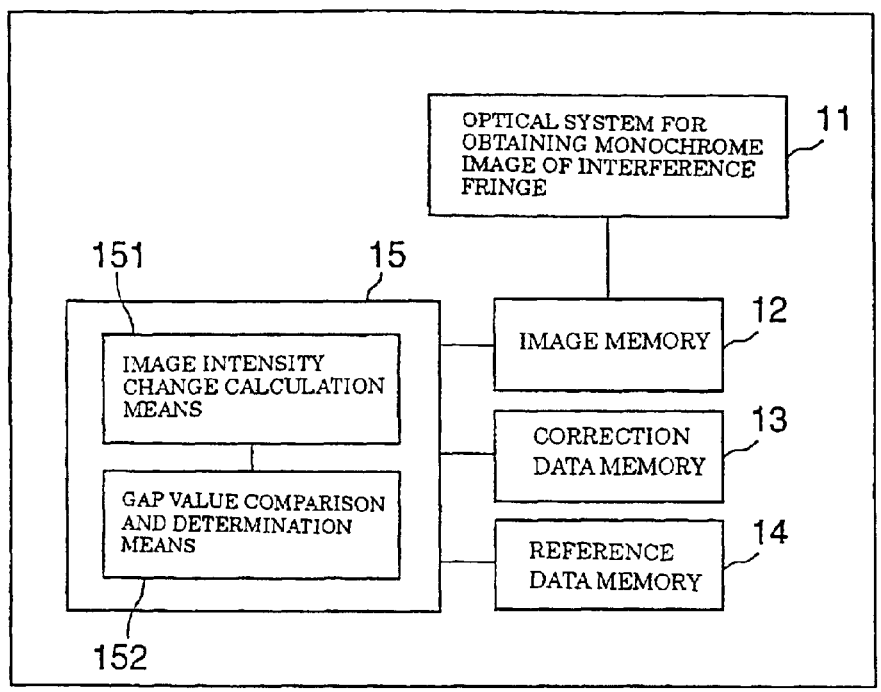
FIG. 5 is a block diagram illustrating a primary configuration of a gap measuring apparatus that is a first embodiment of the invention.

FIG. 5 is a block diagram illustrating a primary configuration of a gap measuring apparatus that is an embodiment of the invention. Further, reference numeral 11 designates an optical system for obtaining a monochrome image of an interference fringe, which has been described in the description of the first to fourth examples in Section (1). Reference numeral 12 denotes an image memory for storing image data obtained by the optical system 11. Reference numeral 13 designates a correction data memory for preliminarily storing correction data which will be described later. Reference numeral 14 denotes a reference data memory for storing reference data relating to a theoretical change in the intensity of the interference fringes within the wavelength scanning range according to a plurality of predetermined gap values.

Further, reference numeral 15 designates means for determining the gap value of a gap provided in an object to be measured. This means 15 has image intensity change calculation means 151 for obtaining a change in the intensity of a fixed position among predetermined positions (which are arbitrarily set in each image, for example, at all pixels over the image or every pixel on a center line in the width direction of the image) in each image across the images of interference fringes corresponding to the scanned wavelength, which are read out from the image memory 12, and for correcting the change in the intensity according to correction data stored in the correction data memory 13, and also has gap value comparison and determination means 152 for comparing a change in the intensity obtained by the image intensity change calculation means 151, with a theoretical intensity change stored in the reference data memory 14, to determine a set gap value corresponding to the theoretical change in the intensity, which is most close to the change in the intensity obtained by the image intensity calculation means 151, as the gap value at the fixed position on the object.

(ii) Correction Data Stored in Correction Data Memory 13

Figure 6:
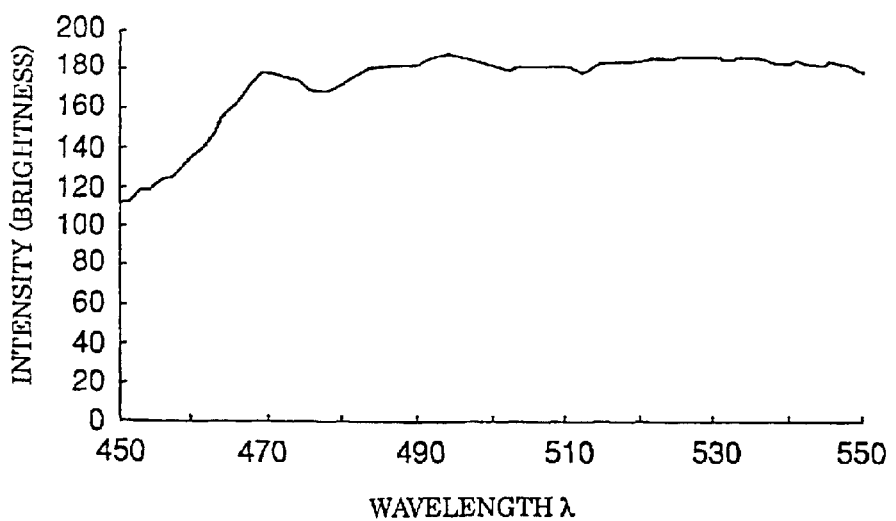
FIG. 6 is a graph illustrating correction data for correcting a change in the intensity of an interference fringe, which is obtained from the image.
Figure 7:
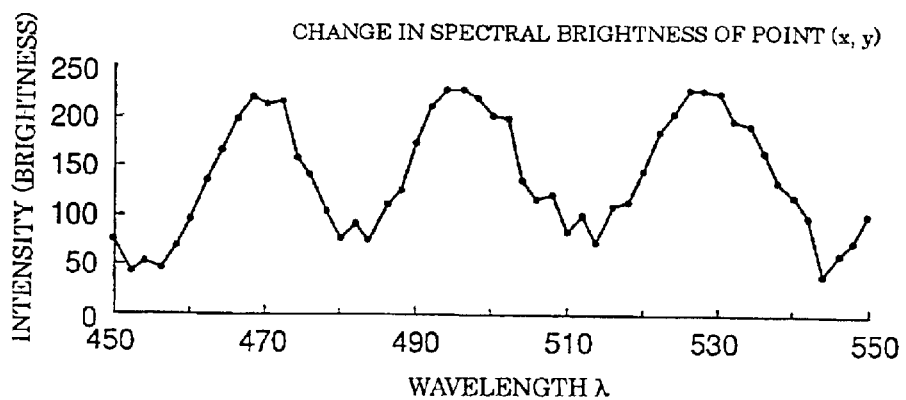
FIG. 7 is a graph illustrating a change in the intensity of an interference fringe at a certain position in the image within a predetermined range of wavelengths.
Figure 8:
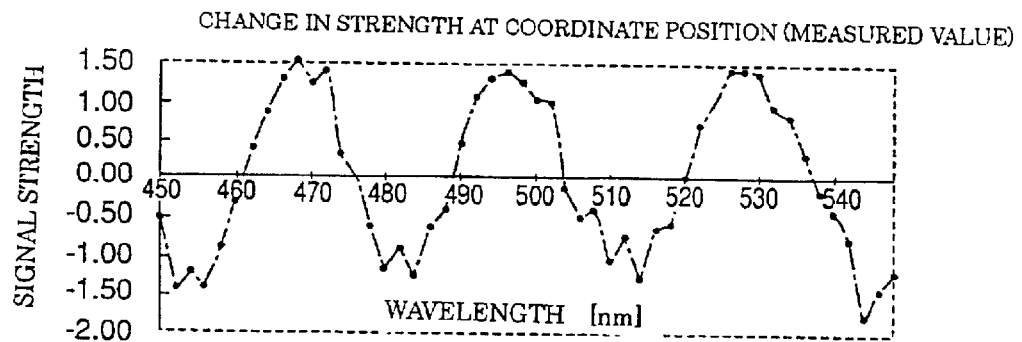
FIG. 8 is a graph illustrating corrected change in the intensity of an interference fringe at a certain position in the image within a predetermined range of wavelengths.

An image taken by the monochrome camera 3 is affected mainly by the variable factors, such as (a) the emission spectroscopy characteristics of the light source, (b) the spectral characteristics of a lighting optical system, and (c) the spectral characteristics of the camera. Therefore, influence based on those factors should be eliminated. Hence, it is preferable that a correction table is preliminarily created, and that the change in the intensity, which is obtained from the images taken by the camera, is corrected into an appropriate value. This correction table contains data as illustrated in FIG. 6 that indicates the relation between the wavelength and the intensity (or brightness). This data is obtained by measuring the mean intensity of an image of an interference fringe in a region having a dense interference fringe, at every wavelength or by preparing a sample having a gap that is equal to or longer than a coherence length, and measuring the intensity thereof at every wavelength. When the change in the intensity of the fixed position which is obtained from the images taken by the camera and illustrated in FIG. 7 is divided or subtracted by the data contained in this correction table to normalize, data illustrated in FIG. 8, which represents the corrected change in the intensity of the fixed position in the images, is obtained.

(iii) Reference Data Stored in Reference Data Memory 14

Figure 9:
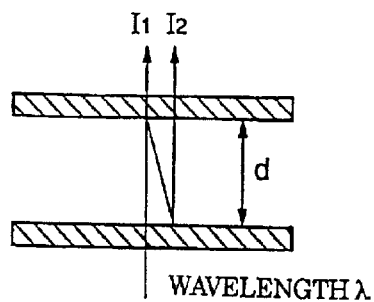
FIG. 9 is a schematic diagram illustrating interference between light waves $I_1$ and $I_2$ transmitted by a gap.

When light having a wavelength $\lambda$ is passed through a gap d provided between parallel flat-plates, light waves $I_1$ and $I_2$ passed therethrough interfere with each other as illustrated in FIG. 9. Thus, the intensity I of a fixed position in a image of an interference fringe is given by:

$$I=I_1+I_2+2(I_1 \cdot I_2)^{1/2} \cdot \cos(4\pi d/\lambda) \qquad (2).$$

Figure 10:
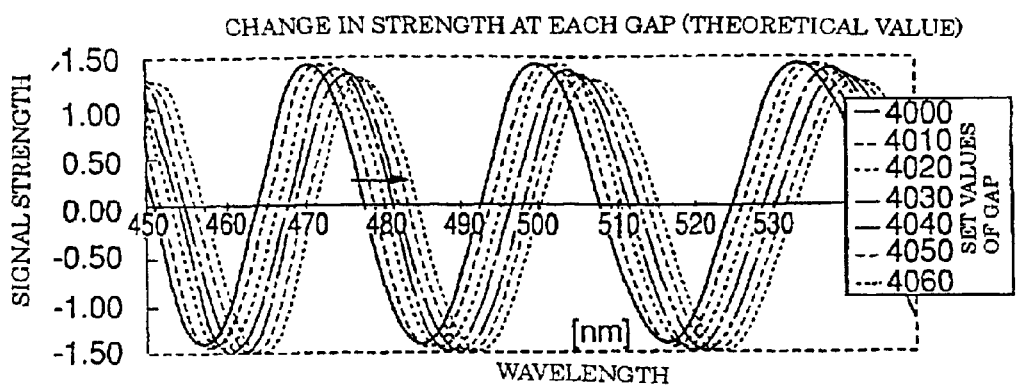
FIG. 10 is a graph illustrating a theoretical change in the intensity of interference fringes within a predetermined range of wavelengths according to a plurality of predetermined gap values.

Incidentally, for example, in the case that $I_1+I_2=2(I_1 \cdot I_2)^{1/2}=\frac{1}{2}$, and that a value within a range to be measured, for instance, from 3000 nm to 4100 nm is given to the gap d, the intensity I of the fixed position in the image is obtained corresponding to each scanned wavelength $\lambda$. Further, the theoretical change in the intensity within the wavelength scanning range is obtained according to this intensity I. Such processing is performed correspondingly to each of a plurality of preliminarily set gap values. Consequently, reference data representing the theoretical change in the intensity according to the set gap values, as illustrated in, for instance, a graph of FIG. 10 is obtained.

(iv) Measuring Procedure

Figure 11:
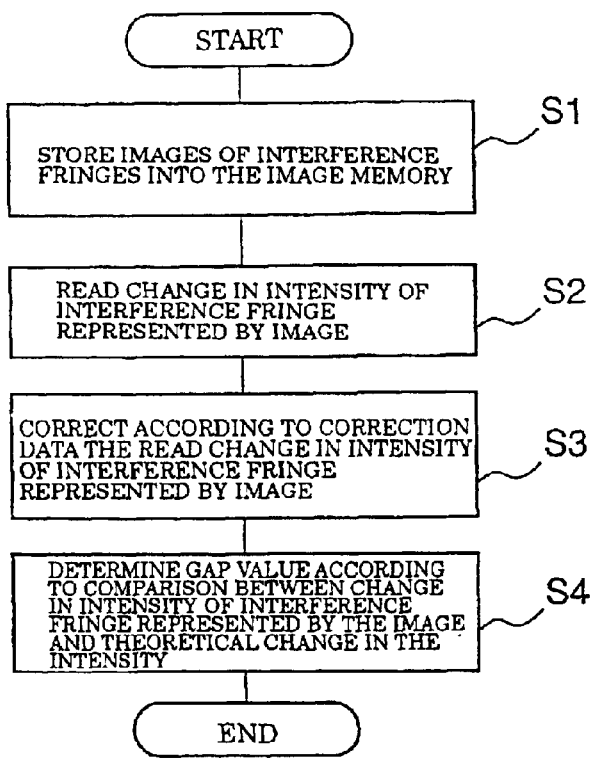
FIG. 11 is a flowchart illustrating a measuring procedure to be performed by a gap measuring apparatus that is the first embodiment of the invention.

FIG. 11 is a flowchart illustrating a measuring procedure to be performed by the gap measuring apparatus that is the first embodiment of the invention.

First, data representing a plurality of monochrome images of interference fringes corresponding to scanned wavelengths are stored into the image memory 12 at step S1 by utilizing the optical system 11 for obtaining a monochrome image of an interference fringe.

Subsequently, the image intensity change calculation means 151 reads out, for example, 100 images from the image memory 12, obtains a change in the intensity of a fixed position among the aforementioned predetermined positions in each image, across the 100 images, at step S2. Then, the image intensity change calculation means 151 corrects the obtained change in the intensity according to the correction data stored in the correction data memory 13 at step S3, so that the change in the intensity of the fixed position in the images within the wavelength scanning range is represented by using the corrected data.

Furthermore, the gap value comparison and determination means 152 compares the change in the intensity obtained by the image intensity change calculation means 151, with the theoretical intensity change represented by the reference data stored in the reference data memory 14. Then, the gap value comparison and determination means 152 determines the gap value, which corresponds to a theoretical intensity change that is closest to the obtained change in the intensity of the fixed position in the images, as a gap value of a gap provided in the object at a position corresponding to the fixed position in the images, at step 54.

Therefore, in the case that, for instance, the predetermined positions are set in the central portion of the object with uniform intervals in the direction of width, and the data processing consisting of steps S2 to S4 is performed correspondingly to each of the predetermined positions, the gap in the direction of width and in the central portion of the object can be determined.

Incidentally, the steps S2 to S4 may be repeatedly performed for each of the predetermined positions. Further, gap values at all the predetermined positions may be determined by obtaining a change in the intensity of each predetermined position by steps S2 and S3 and comparing the obtained change with the theoretical change in the intensity.

Additionally, in the case that a CCD camera is used as the monochrome camera 3, and that the process consisting of steps S2 to 54 is repeatedly performed on each of the pixels of the obtained image, the gap of the object can be measured in a three-dimensional manner.

Second Embodiment (i) Configuration

Figure 12:
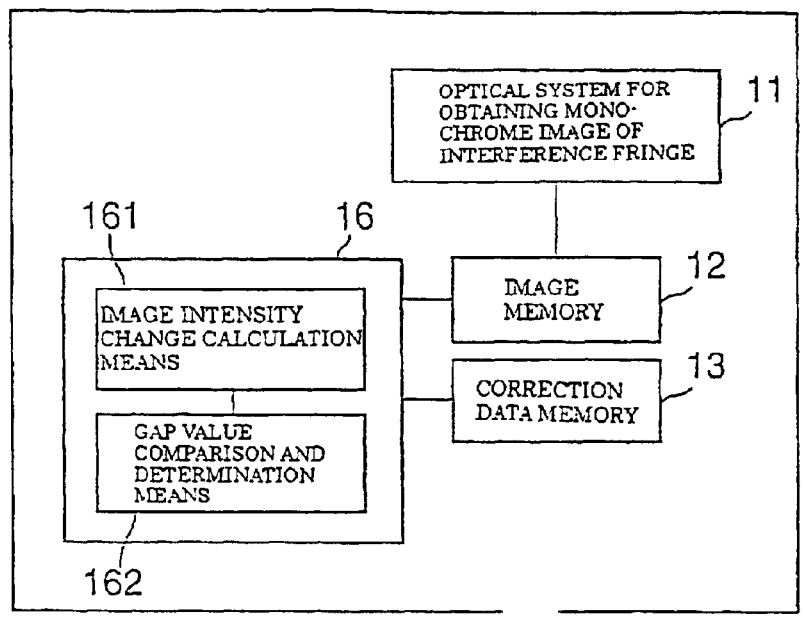
FIG. 12A is a block diagram illustrating a primary configuration of a gap measuring apparatus that is a second embodiment of the invention.
FIG. 12B is a graph illustrating an operation of calculating a gap value of an object, which is performed by the gap measuring apparatus that is the second embodiment of the invention.
Figure 12:
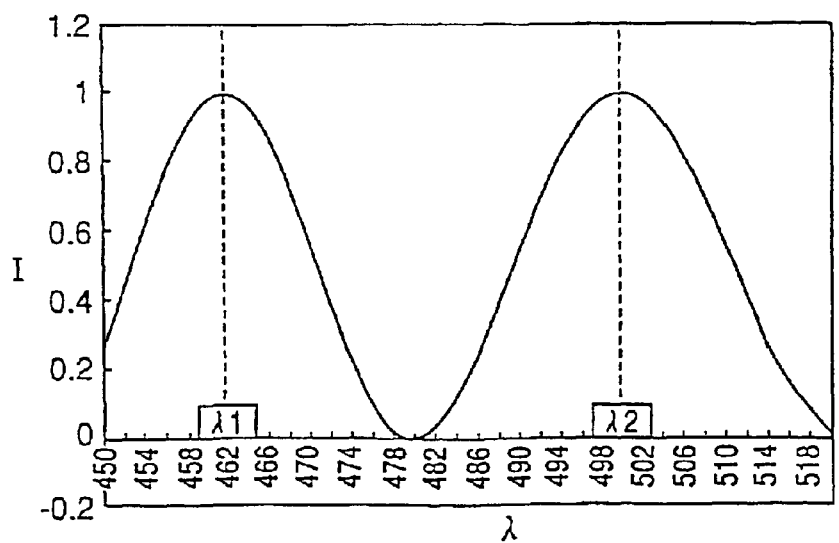

FIG. 12A is a block diagram illustrating a primary configuration of a gap measuring apparatus that is another embodiment of the invention. Incidentally, each of reference numerals 11 to 13 designates a constituent element that is the same as the corresponding constituent elements described in the description of the first embodiment. Further, means 16 for determining a gap value comprises image intensity change calculation means 161 for reading out a plurality of images from the image, memory 12, obtaining a change in the intensity of a fixed position among the aforementioned predetermined positions in each image across the read out images, and correcting the change in the intensity according to correction data stored in the correction data memory 13, and also comprises gap value calculation means 162 for obtaining wavelengths $\lambda 1$ and $\lambda 2$ corresponding to peaks appearing in the change in the intensity corrected by the means 161 and for calculating the gap value d of the object according to the following equation:

$$d=\lambda 1 \cdot \lambda 2/2(\lambda 2-\lambda 1) \tag{3}$$

Incidentally, the equation (3) is explained in FIG. 12B. In a change in the intensity of light with a variable wavelength, at a certain position, if a peak of the intensity appears at wavelength $\lambda 1$ and a next peak appears at the wavelength $\lambda 2$, the following equation is adapted.

$$m\lambda 1=2d, (m-1)\lambda 2=2d,$$

where 2d is a difference in optical path lengths caused by the gap, and m is a order number of the wavelength $\lambda 1$.
Then, m is deleted from the equations to obtain $$d=\lambda 1 \cdot \lambda 2/2(\lambda 2-\lambda 1).$$

(ii) Measuring Procedure

Figure 13:
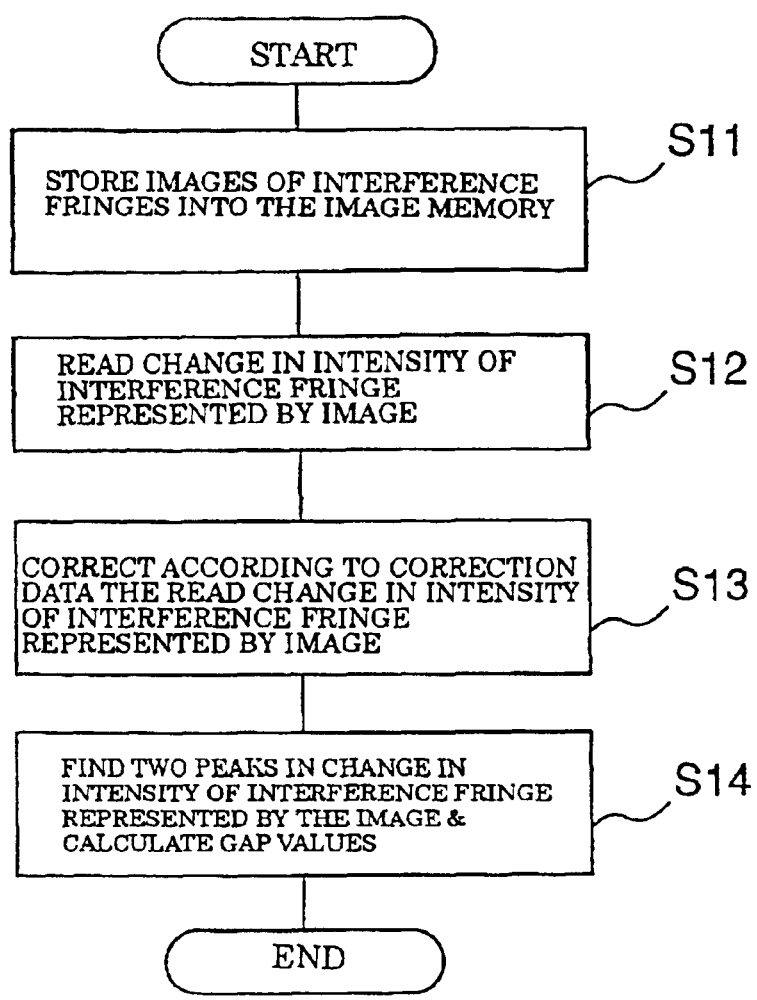
FIG. 13 is a flowchart illustrating a measuring procedure to be performed by the gap measuring apparatus that is the second embodiment of the invention.
Figure 14:
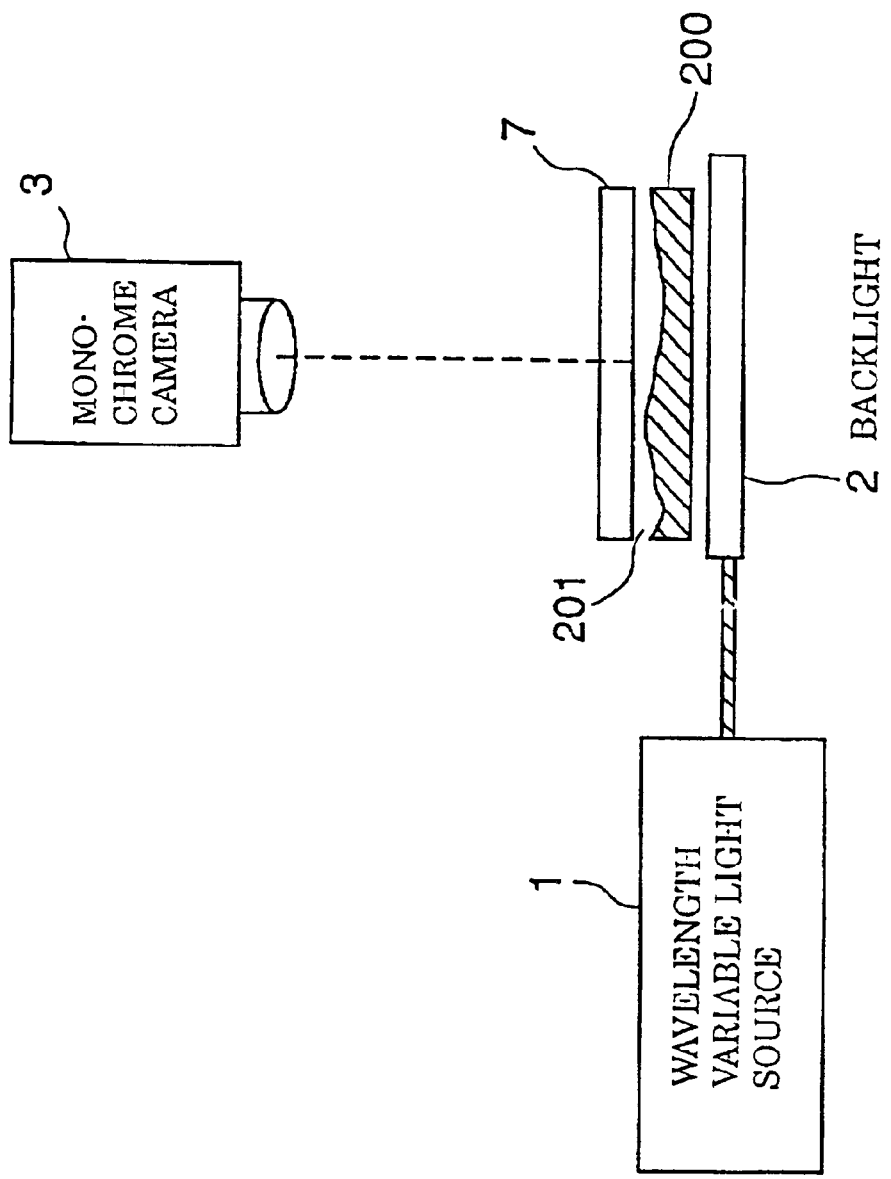
FIG. 14 is a diagram illustrating the configuration of a fifth optical system for obtaining a monochrome image of an interference fringe according to a mode for carrying out the invention.
Figure 15:
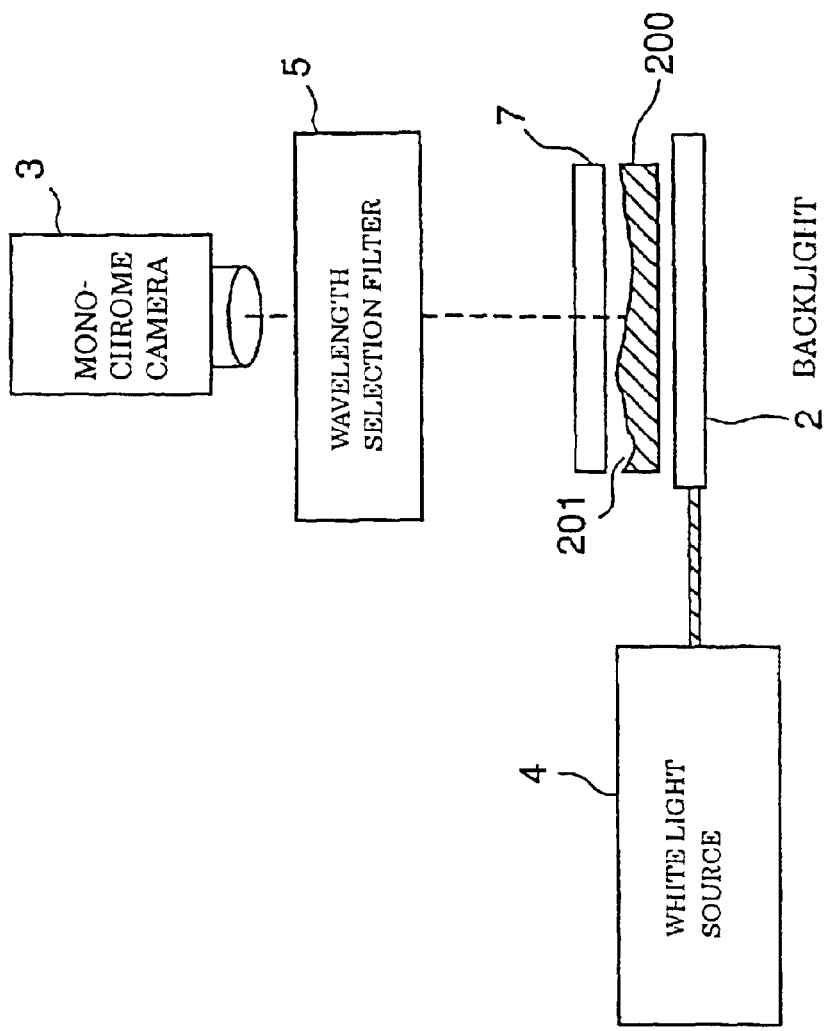
FIG. 15 is a diagram illustrating the configuration of a sixth optical system for obtaining a monochrome image of an interference fringe according to a mode for carrying out the invention.
Figure 16:
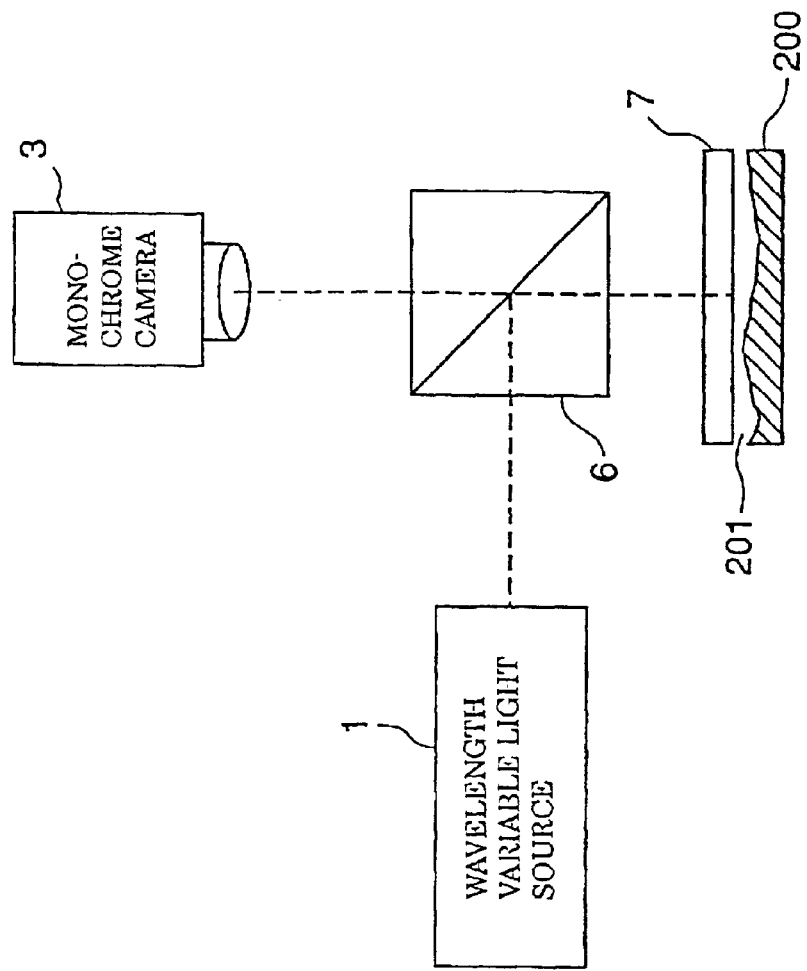
FIG. 16 is a diagram illustrating the configuration of a seventh optical system for obtaining a monochrome image of an interference fringe according to a mode for carrying out the invention.
Figure 17:
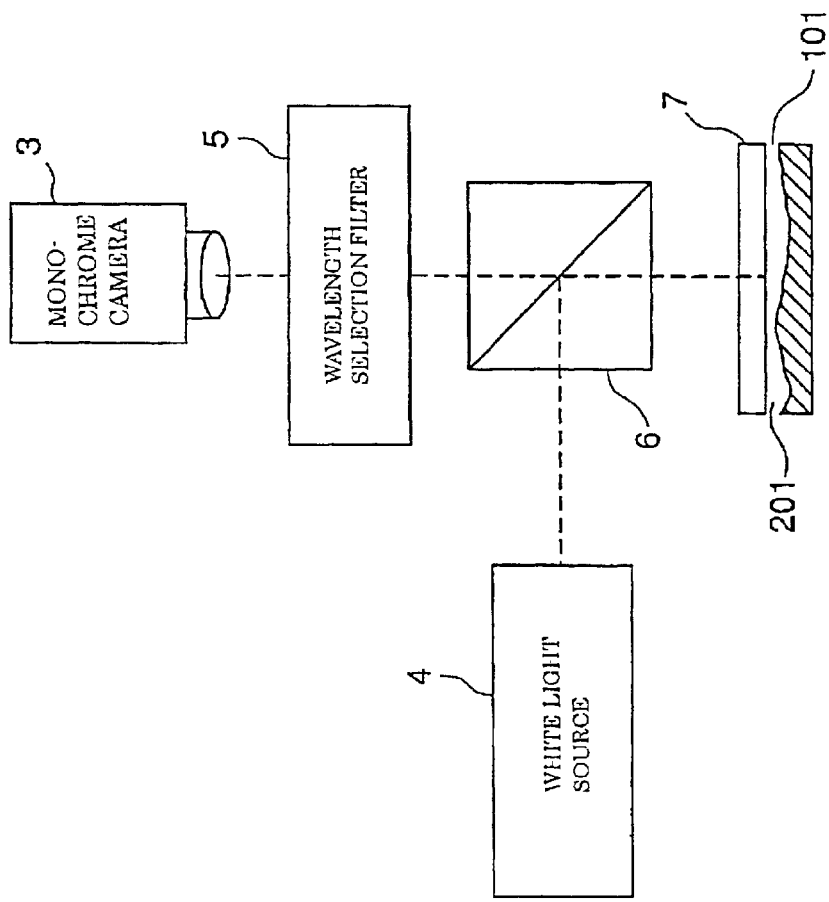
FIG. 17 is a diagram illustrating the configuration of a eighth optical system for obtaining a monochrome image of an interference fringe according to a mode for carrying out the invention.

FIG. 13 is a flowchart illustrating the measuring procedure to be performed by the gap measuring apparatus that is the second embodiment of the invention.

First, a plurality of monochrome images of interference fringes are stored into the image memory 12 at step S11 by utilizing the optical system 11 for obtaining a monochrome image of an interference fringe.

Subsequently, the image intensity change calculation means 161 reads out, for example, 100 images from the image memory 12, obtains a change in the intensity of a fixed position among aforementioned predetermined positions in each image, across the 100 images, at step S12. Then, the image intensity change calculation means 161 corrects the obtained change in the intensity according to the correction data stored in the correction data memory 13 at step S13, so that the change in the intensity of the fixed position in the images within the wavelength scanning range is represented by using the corrected data.

Furthermore, the gap value calculation means 162 obtains wavelengths $\lambda 1$ and $\lambda 2$ corresponding to peaks appearing in the change in the intensity corrected by the means 161 and calculates the gap value of the gap of the object at a position corresponding to the fixed position in the images, at step S14.

Therefore, in the case that, for instance, the predetermined positions are set in the central portion of the object with uniform intervals in the direction of width, and the data processing consisting of steps S12 to S14 is performed correspondingly to each of the predetermined positions, the gap in the direction of width and in the central portion of the object can be determined.

Incidentally, the steps S12 to S14 may be repeatedly performed for each of the predetermined positions. Further, gap values at all the predetermined positions may be determined by obtaining a change in the intensity of each predetermined position by steps S12 and S13 and comparing the corrected change with the theoretical change in the intensity.

Additionally, in the case that a CCD camera is used as the monochrome camera 3, and that the process consisting of steps S12 to S14 is repeatedly performed on each of the pixels of the obtained image, the gap of the object can be measured in a three-dimensional manner.

(3) Shape Measuring Apparatus of the Invention (i) Configuration

A shape measuring apparatus according to an embodiment of the invention is configured by adding additional constituent elements to the gap measuring apparatus described in the description of the first or second embodiment. That is, the optical system 11 for obtaining a monochrome image of an interference fringe as illustrated in FIGS. 1 to 4 is replaced with an optical system 12, to which a transparent plate-like element 7 having a surface facing an object 200 in such a way as to provide a gap 201 and as to be flat is added, for obtaining a monochrome image of an interference fringe as illustrated in FIGS. 14 to 17. Moreover, the shape measuring apparatus of the invention has gap-value-to-shape conversion means 17 for determining the shape of the object 200 according to the gap value obtained by gap value determination means 15 or 16. This utilizes the fact that the difference between the gap values of the gap formed between the transparent plate-like element 7 and the object 200 at given two places on the flat surface of the element 7 corresponds to a change in height of the gap forming surface of the object 200 at the given two places because the transparent plate-like element 7 has the flat shape.

Figure 18:
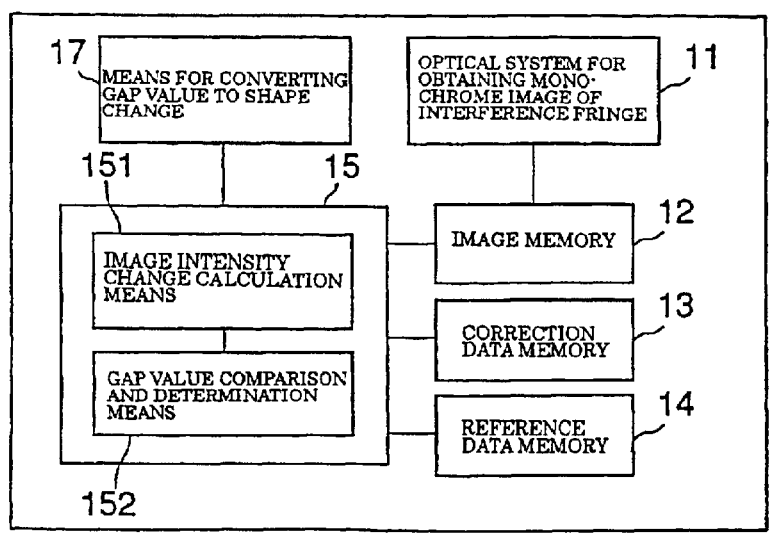
FIG. 18 is a block diagram illustrating a primary configuration of a gap measuring apparatus that is a third embodiment of the invention.
Figure 19:
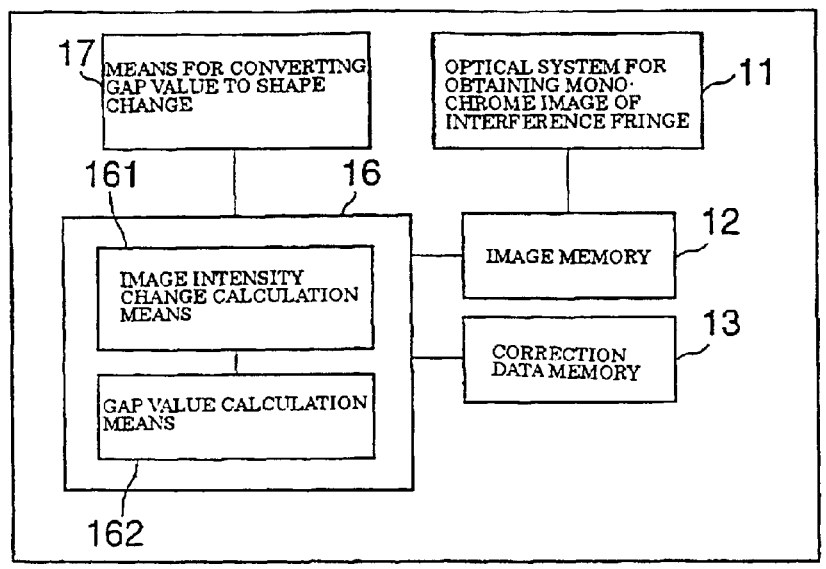
FIG. 19 is a block diagram illustrating a primary configuration of a gap measuring apparatus that is a fourth embodiment of the invention.
Figure 20:
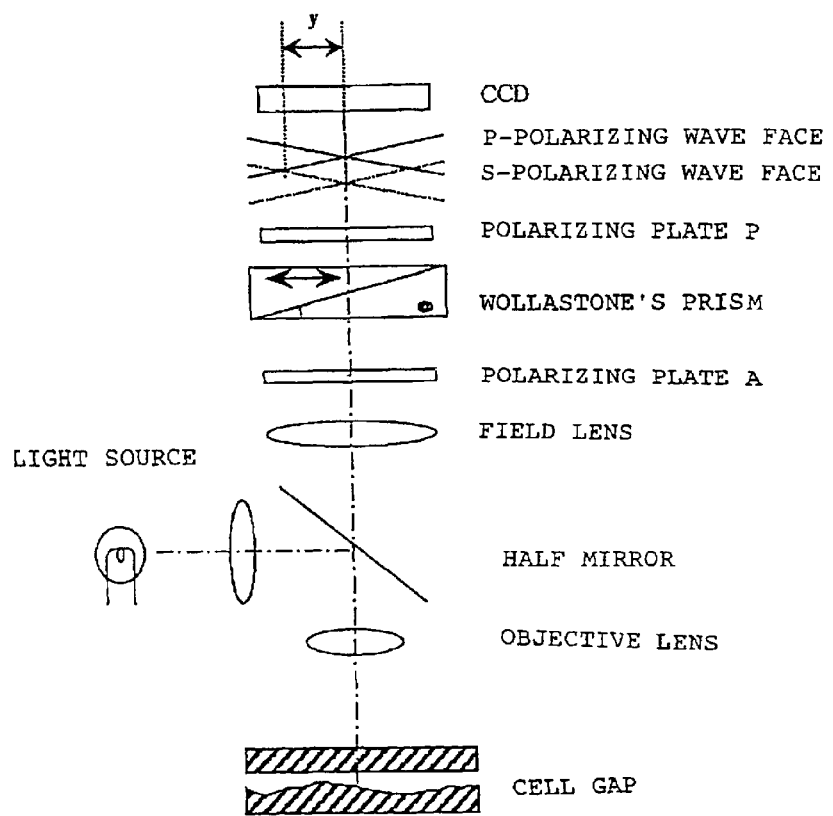
FIG. 20 is a diagram illustrating the configuration of a conventional gap measuring apparatus.

The configuration of a shape measuring apparatus constituted as a third embodiment of the invention is illustrated in a block diagram of FIG. 18, while that of a shape measuring apparatus constituted as a fourth embodiment of the invention is illustrated in a block diagram of FIG. 19. Incidentally, the third embodiment corresponds to the gap measuring apparatus that is the first embodiment. Further, the fourth embodiment corresponds to the gap measuring apparatus that is the second embodiment.

(ii) Measuring Procedure

In the case of the shape measuring apparatus that is the third embodiment, processing to be performed at steps S2 to S4 is performed over a measuring range of the object 200 after step S1 illustrated in FIG. 11. Thus, a plurality of gap values of gaps formed between the transparent plate-like element 7 and the object 200 are determined. Subsequently, the gap-value-to-shape conversion means 17 converts the determined gap value into data representing a change in the shape of the gap forming surface of the object 200, so that the shape of the gap forming surface of the object 200 in the measuring range is measured.

In the case of the shape measuring apparatus that is the fourth embodiment, processing to be performed at steps S12 to S14 is performed over a measuring range of the object 200 after step S11 illustrated in FIG. 13. Thus, a plurality of gap values of gaps formed between the transparent plate-like element 7 and the object 200 are determined. Subsequently, the gap-value-to-shape conversion means 17 converts the determined gap value into data representing a change in the shape of the gap forming surface of the object 200, so that the shape of the gap forming surface of the object 200 in the measuring range is measured.

According to the gap measuring apparatus of the invention and the shape measuring apparatus of this embodiment thereof, a gap of a transparent liquid crystal cell having a micro-gap and a minute change in the shape of a member can be measured at a high speed with an accuracy of about several nanometers.

Further, each of the optical systems of the gap measuring apparatuses according to the invention and the shape measuring apparatuses of this embodiment thereof is configured so that the two light waves forming the interference fringes pass through the same optical path. Thus, even when a shock is given thereto, the optical path difference between theses light waves is always stable, and the measuring accuracy thereof can be maintained.

Incidentally, although the wavelength scanning is performed at every nanometer in the range of wave length from 450 nm to 550 nm according to the mode for carrying out the invention or the embodiments thereof, such values can be suitably determined. However, a higher accuracy measurement is enabled by obtaining about 100 image data at one point.

Further, although the reference data is preliminarily calculated and stored in the reference data memory 14 according to the mode for carrying out the invention or to the embodiments, means for calculating the reference data may be provided in the apparatuses.

Furthermore, although the image memory, the correction data memory, and the reference data memory of each of the embodiments are illustrated as different memories, these memories may be constituted as one memory (or unit).

Additionally, programs for performing the functions of the gap value determination means 15, the gap-value-to-shape conversion means 17, or of the gap value determination means 16 and the gap-value-to-shape conversion means 17 may be executed by the same CPU.

Figure 21:
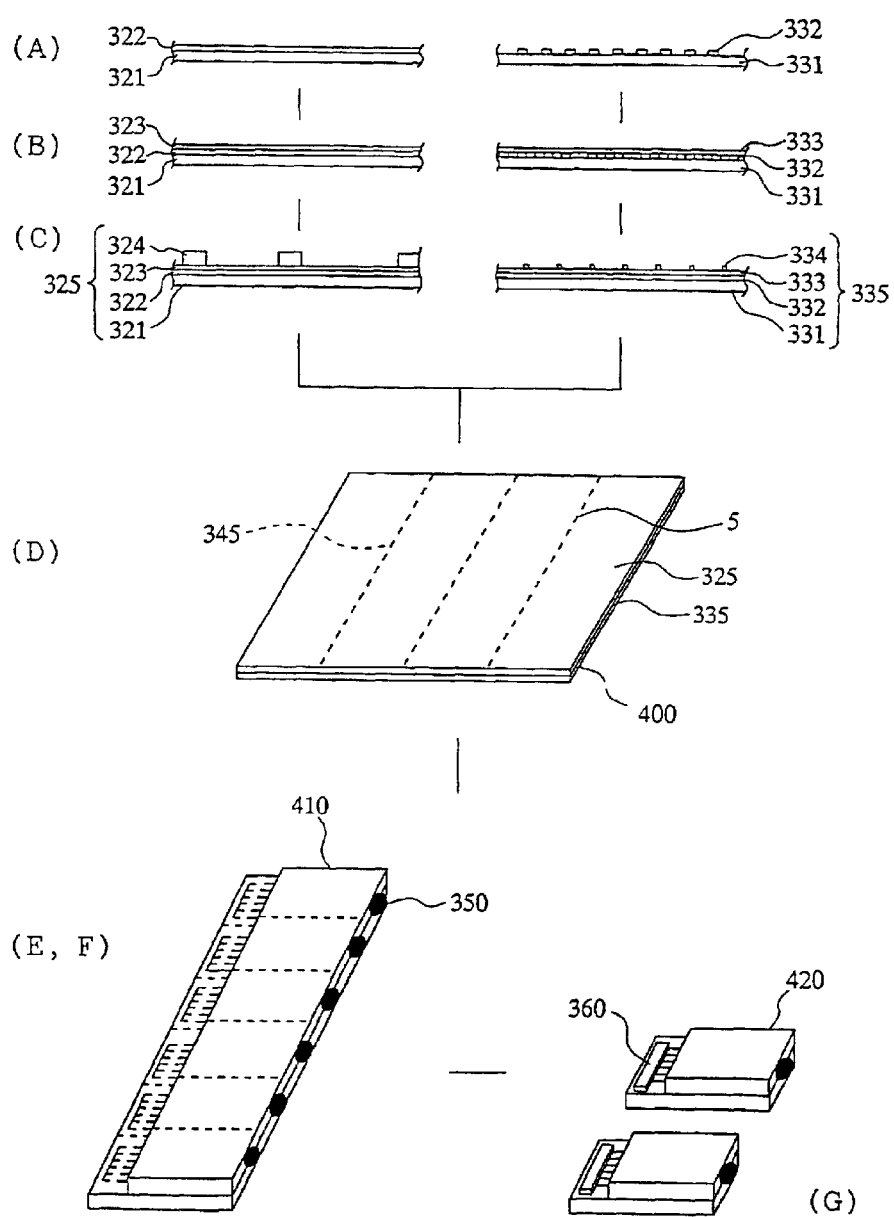
FIG. 21 is a diagram illustrating a process of manufacturing a liquids crystal device according to a mode for carrying out the invention.

Finally, an example of a process of manufacturing a liquid crystal device utilizing the gap measuring method or apparatus according to the invention is described hereinbelow with reference to FIG. 21.

At step A, first, necessary circuits are formed on an upper substrate 321 and a lower substrate 331 by using photolithography. For example, a common electrode 322 is formed on the upper substrate 321, while a thin film transistor 332 is formed on the lower substrate 331. Incidentally, elements formed at this step are changed according to the kind of the liquid crystal device.

Subsequently, at step B, an oriented film 323 is formed on the upper substrate 321, on which the common electrode 322 is formed. Then, rubbing is performed thereon. Moreover, similarly, an oriented film 333 is formed on the lower substrate 331, on which a thin film transistor 332 is formed, then rubbing is performed thereon.

Subsequently, at step C, a sealing material 324 for sealing the light crystal is applied to one of the substrates, for instance, the upper substrate 321. Further, a gap material 334 is sprayed onto the oriented film 333 formed on the lower substrate 331. Incidentally, the manner of application of the sealing material and spraying of the gap material is not limited to the aforementioned manner. It is possible that the sealing material is applied to and the gap material is sprayed onto one of the substrates.

Then, at step D, a panel 400 is manufactured by sticking the two substrates 325 and 335 made at steps A to C to each other. Further, the gap formed in this panel 400 is measured by using the aforementioned gap measuring method or apparatus. Moreover, it is checked whether or not the gap value of the gap is within a prescribed range.

Subsequently, at step E serving as a first breaking step, a strip-like panel 410 is manufactured by parting the panel 400 verified as being within the prescribed range.

Then, at step F, liquid crystal is injected into the gap through a liquid crystal injecting portion of the strip-like panel 410. Subsequently, the liquid crystal is sealed by a liquid crystal sealing material 350.

Moreover, at step G serving as a second breaking step, a panel 420, whose size is equal to that of one panel of a product, is formed by parting the strip-like panel 410, in which the liquid crystal is sealed. Then, a driver IC 360 is mounted on the panel 420. Thus, a liquid crystal device is completed.

According to the methods and apparatuses of the invention, a measurement of each of a gap with width or shape of the object can be performed at a high speed with high accuracy without moving the object or apparatus.

Further, in manufacturing a liquid crystal device, a gap in which liquid crystal is injected is checked at once, so that the manufacturing efficiency of a liquid crystal device is improved.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A gap measuring method comprising the steps of:
   shifting a wavelength of light stepwise within a predetermined wavelength range to use the light for measuring a gap;
   taking an image of an interference fringe, which is generated owing to a gap provided in a measured object and the used light with the shifted wavelength, by a camera correspondingly to each step of the shifted wavelength;
   obtaining a change in the intensity of the images of the interference fringes taken by said camera at each of predetermined positions of each image, over said predetermined wavelength range; and
   determining gap values of a plurality of points of the gap based on the obtained changes in the intensity.

2. A gap measuring method according to claim 1, wherein said step of determining a gap value includes the steps of:
   obtaining a theoretical change in the intensity of the images, over said predetermined wavelength range, correspondingly to each of preliminarily set gap values; and
   determining the gap value of said measured object based on the change in the intensity of the fixed position of each image taken by the camera and the obtained theoretical changes in the intensity.

3. A gap measuring method according to claim 1, wherein said step of determining a gap value includes the steps of:

obtaining a plurality of peaks in said change in the intensity of the images, over the predetermined wavelength range; and calculating gap values of a plurality of points of the measured object based on a plurality of wavelengths respectively corresponding to the peaks.

4. A gap measuring method according to claim 1, wherein said interference fringe is obtained by utilizing light transmitted by said measured object.

5. A gap measuring method according to claim 1, wherein said interference fringe is obtained by utilizing light reflected from said measured object.

6. A gap measuring method according to claim 1, wherein said shifted wavelength of the used light is obtained by shifting a wavelength of light emitted from a light source to said measured object.

7. A gap measuring method according to claim 1, wherein said shifted wavelength of the used light is obtained by providing a filter, which is adapted to selectively transmit a certain wavelength of light to the side of said camera.

8. A gap measuring method according to claim 1, wherein said change in the density of images taken by the camera, is corrected in consideration of variable factors.

9. A gap measuring method according to claim 1, wherein the said image consists of a plurality of pixels, to measure the gap value for each of the pixels.

10. A shape measuring method comprising the steps of:

measuring gap values of a gap between a pair of members, one of which has a flat surface, by the gap measuring method according to claim 1; and determining a shape of the other member constituting said gap, based on the measured gap values.

11. A gap measuring apparatus comprising:

a wavelength variable light source for shifting a wavelength of light stepwise within a predetermined range and applying the light with the shifted wavelength onto a light transmissible object that is to be measured and is provided with a gap;

a camera for taking an image of an interference fringe formed by the light transmitted by said object, correspondingly to each step of the shifted wavelength;

an image memory for storing images taken by said camera; and means for obtaining a change in the intensity of the images taken by said camera, at each of predetermined positions of each image over said predetermined wavelength range; and means for determining gap values of a plurality of points of the gap based on the obtained changes in the intensity.

12. A gap measuring apparatus comprising:

a white light source for applying white light onto a light transmissible object that is to be measured and is provided with a gap;

a filter for shifting, stepwise, a wavelength of the light transmitted by said measured object within a predetermined wavelength range to send the light with the shifted wavelength to said camera;

a camera for taking an image of an interference fringe formed by said light transmitted by the filter, correspondingly to each step of the shifted wavelength;

an image memory for storing images taken by said camera;

means for obtaining a change in the intensity of the images taken by said camera, at each of predetermined positions of each image over said predetermined wavelength range; and means for determining gap values of a plurality of points of the gap based on the obtained changes in the intensity.

13. A gap measuring apparatus comprising:

a wavelength variable light source for shifting a wavelength of light stepwise within a predetermined range and emitting the light with the shifted wavelength;

a camera for taking an image of an interference fringe of light;

optical means for directing the light emitted from said light source to a measured object provided with a gap and directing the light reflected by said measured object to said camera;

an image memory for storing images of interference fringes formed by the light from said optical means and taken by said camera; and means for obtaining a change in the intensity of the images taken by said camera, at each of predetermined positions of each image over said predetermined range; and means for determining gap values of a plurality of points of the gap based on the obtained changes in the intensity.

14. A gap measuring apparatus comprising:

a white light source for emitting white light;

a camera for taking an image of an interference fringe of light;

optical means for directing the light emitted from said light source to a measured object provided with a gap and directing the light reflected by said measured object to said camera;

a filter for shifting, stepwise, a wavelength of the light from said optical means within a predetermined range to send the light with the shifted wavelength to said camera;

an image memory for storing images of interference fringes formed by the light from said optical means and taken by said camera; and means for obtaining a change in the intensity of the images taken by said camera, at each of predetermined positions of each image over said predetermined wavelength range; and means for determining gap values of a plurality of points of the gap based on the obtained changes in the intensity.

15. A gap measuring apparatus according to claim 11, wherein said means for determining a gap value includes:

a reference data memory for storing data representing a theoretical change in the intensity of the images, over said predetermined range, correspondingly to each of preliminarily set gap values; and gap value comparison and determination means for determining gap values of a plurality of points of gap based on the changes in the intensity of the images and the theoretical changes in the intensity.

16. A gap measuring apparatus according to claim 11, wherein said means for determining the gap values includes:

means for obtaining a plurality of peaks in said change in the intensity of the images, over the predetermined wavelength range; and means for calculating gap values of a plurality of points of the gap based on a plurality of wavelengths respectively corresponding to the peaks.

17. A gap measuring apparatus according to claim 11, which further comprises correction means for correcting the change in the intensity of the images taken by the camera, in consideration of variable factors.

18. A shape measuring apparatus comprising:
a wavelength variable light source for shifting a wavelength of light stepwise within a predetermined range and irradiating the light with the shifted wavelength onto a light transmissible object that is to be measured;
a light transmissible plate-like element which has a flat surface and is oppositely placed to said object with intervention of a gap;
a camera for taking an image of an interference fringe formed by the light with the shifted wavelength transmitted by said object and said plate-like element, correspondingly to each step of the shifted wavelength;
an image memory for storing images taken by said camera;
means for obtaining a change in the intensity of the images taken by said camera, at each of predetermined positions of each image over said predetermined range; means for determining gap values of a plurality of points of the gap based on the obtained changes in the intensity; and
gap-value-to-shape conversion means for determining a shape of said object based on the determined gap values.

19. A shape measuring apparatus comprising:
a white light source for emitting white light onto a light transmissible object that is to be measured;
a light transmissible plate-like element which has a flat surface and is oppositely placed to said object with intervention of a gap;
a filter for shifting, stepwise, wavelength of the light transmitted by the object and the plate-like element within a predetermined range to send the light with the shifted wavelength to said camera;
a camera for taking an image of an interference fringe formed by said light transmitted by said filter, correspondingly to each step of the shifted wavelength;
an image memory for storing images taken by said camera;
means for obtaining a change in the intensity of the images taken by said camera, at each of predetermined positions of each image over said predetermined wavelength range; means for determining gap values of a plurality of points of the gap based on the obtained changes in the intensity; and
gap-value-to-shape conversion means for determining a shape of said object based on the determined gap values.

20. A shape measuring apparatus comprising:
a wavelength variable light source for shifting a wavelength of light stepwise within a predetermined range and emitting the light with the shifted wavelength onto an object to be measured;
a light transmissible plate-like element which has a flat surface and is oppositely placed to said object with intervention of a gap;
a camera for taking an image of an interference fringe of light;
optical means for directing the light emitted from said light source to an object to be measured and directing the light reflected by said object and said plate-like element to said camera;
an image memory for storing images of interference fringes formed by the light from said optical means and taken by said camera;
means for obtaining a change in the intensity of the images taken by said camera, at each of predetermined positions of each image over said predetermined wavelength range; means for determining gap values of a plurality of points of the gap based on the obtained changes in the intensity; and
gap-value-to-shape conversion means for determining a shape of said object based on the determined gap values.

21. A shape measuring apparatus comprising:
a white light source for emitting white light onto an object that is to be measured;
a light transmissible plate-like element which has a flat surface and is oppositely placed to said object with intervention of a gap;
a camera for taking an image of an interference fringe of light;
optical means for directing the light emitted from said light source to the object and directing the light reflected by said object and said plate-like element to said camera;
a filter for shifting, stepwise, wavelength of light transmitted from said optical means within a predetermined range to send the light with the shifted wavelength to said camera;
an image memory for storing images of interference fringes formed by the light from said filter and taken by said camera;
means for obtaining a change in the intensity of the images taken by said camera, at each of predetermined positions of each image over said predetermined wavelength range; means for determining gap values of a plurality of points of the gap based on the obtained changes in the intensity; and
gap-value-to-shape conversion means for determining a shape of said object based on the determined gap values.

22. A shape measuring apparatus according to claim 18, wherein said means for determining a gap value includes:
a reference data memory for storing data representing a theoretical change in the intensity of the images, over said predetermined range, correspondingly to each of preliminarily set gap values; and
gap value comparison and determination means for determining gap values of a plurality of points of the gap based on the changes in intensity of the images and the theoretical changes in the intensity.

23. A shape measuring apparatus according to claim 18, wherein said means for determining the gap values includes:
means for obtaining a plurality of peaks in said change in the intensity of the images, over the predetermined wavelength range; and means for calculating gap values of a plurality of the gap based on a plurality of wavelengths respectively corresponding to the peaks.

24. A shape measuring apparatus according to claim 18, which further comprises correction means for correcting the change in the intensity of the images taken by the camera, in consideration of variable factors.

25. A manufacturing method for a liquid crystal device, in which a gap between two substrates is filled with liquid crystal and sealed, wherein gap values of a plurality of points of the gap is measured by utilizing said gap measuring apparatus according to claim 11, and wherein liquid crystal is injected into said gap when the gap values are within a prescribed range, the gap values being measured by:

shifting a wavelength of light stepwise within a predetermined wavelength range to use the light for measuring the gap;

taking an image of an interference fringe, which is generated owing to the gap between the two substrates and the used light with the shifted wavelength, by a camera correspondingly to each step of the shifted wavelength;

obtaining a change in the intensity of the images of the interference fringes taken by said camera at each of predetermined positions of each image, over said predetermined wavelength range; and determining gap values of the plurality of points of the gap based on the obtained changes in the intensity.

26. A gap measuring apparatus according to claim 12, wherein said means for determining a gap value includes:

a reference data memory for storing data representing a theoretical change in the intensity of the images, over said predetermined range, correspondingly to each of preliminarily set gap values; and gap value comparison and determination means for determining gap values of a plurality of points of gap based on the changes in the intensity the images and the theoretical changes in the intensity.

27. A gap measuring apparatus according to claim 13, wherein said means for determining a gap value includes:

a reference data memory for storing data representing a theoretical change in the intensity of the images, over said predetermined range, correspondingly to each of preliminarily set gap values; and gap value comparison and determination means for determining gap values of a plurality of points of gap based on the changes in the intensity the images and the theoretical changes in the intensity.

28. A gap measuring apparatus according to claim 14, wherein said means for determining a gap value includes:

a reference data memory for storing data representing a theoretical change in the intensity of the images, over said predetermined range, correspondingly to each of preliminarily set gap values; and gap value comparison and determination means for determining gap values of a plurality of points of gap based on the changes in the intensity the images and the theoretical changes in the intensity.

29. A gap measuring apparatus according to claim 12, wherein said means for determining the gap values includes:

means for obtaining a plurality of peaks in said change in the intensity of the images, over the predetermined wavelength range; and means for calculating gap values of a plurality of points of the gap based on a plurality of wavelengths respectively corresponding to the peaks.

30. A gap measuring apparatus according to claim 13, wherein said means for determining the gap values includes:

means for obtaining a plurality of peaks in said change in the intensity of the images, over the predetermined wavelength range; and means for calculating gap values of a plurality of points of the gap based on a plurality of wavelengths respectively corresponding to the peaks.

31. A gap measuring apparatus according to claim 14, wherein said means for determining the gap values includes:

means for obtaining a plurality of peaks in said change in the intensity of the images, over the predetermined wavelength range; and means for calculating gap values of a plurality of points of the gap based on a plurality of wavelengths respectively corresponding to the peaks.

32. A gap measuring apparatus according to claim 12, which further comprises correction means for correcting the change in the intensity of the images taken by the camera, in consideration of variable factors.

33. A gap measuring apparatus according to claim 13, which further comprises correction means for correcting the change in the intensity of the images taken by the camera, in consideration of variable factors.

34. A gap measuring apparatus according to claim 14, which further comprises correction means for correcting the change in the intensity of the images taken by the camera, in consideration of variable factors.

35. A shape measuring apparatus according to claim 19, wherein said means for determining a gap value includes:

a reference data memory for storing data representing a theoretical change in the intensity of the images, over said predetermined range, correspondingly to each of preliminarily set gap values; and gap value comparison and determination means for determining gap values of a plurality of points of the gap based on the changes in intensity of the images and the theoretical changes in the intensity.

36. A shape measuring apparatus according to claim 20, wherein said means for determining a gap value includes:

a reference data memory for storing data representing a theoretical change in the intensity of the images, over said predetermined range, correspondingly to each of preliminarily set gap values; and gap value comparison and determination means for determining gap values of a plurality of points of the gap based on the changes in intensity of the images and the theoretical changes in the intensity.

37. A shape measuring apparatus according to claim 21, wherein said means for determining a gap value includes:

a reference data memory for storing data representing a theoretical change in the intensity of the images, over said predetermined range, correspondingly to each of preliminarily set gap values; and gap value comparison and determination means for determining gap values of a plurality of points of the gap based on the changes in intensity of the images and the theoretical changes in the intensity.

38. A shape measuring apparatus according to claim 19, wherein said means for determining the gap values includes:

means for obtaining a plurality of peaks in said change in the intensity of the images, over the predetermined wavelength range; and means for calculating gap values of a plurality of the gap based on a plurality of wavelengths respectively corresponding to the peaks.

39. A shape measuring apparatus according to claim 20, wherein said means for determining the gap values includes:

means for obtaining a plurality of peaks in said change in the intensity of the images, over the predetermined wavelength range; and means for calculating gap values of a plurality of the gap based on a plurality of wavelengths respectively corresponding to the peaks.

40. A shape measuring apparatus according to claim 21, wherein said means for determining the gap values includes:

means for obtaining a plurality of peaks in said change in the intensity of the images, over the predetermined wavelength range; and means for calculating gap values of a plurality of the gap based on a plurality of wavelengths respectively corresponding to the peaks.

41. A shape measuring apparatus according to claim 19, which further comprises correction means for correcting the change in the intensity of the images taken by the camera, in consideration of variable factors.

42. A shape measuring apparatus according to claim 20, which further comprises correction means for correcting the change in the intensity of the images taken by the camera, in consideration of variable factors.

43. A shape measuring apparatus according to claim 21, which further comprises correction means for correcting the change in the intensity of the images taken by the camera, in consideration of variable factors.

* * * * *

UNITED STATES PATENT AND TRADEMARK OFFICE
CERTIFICATE OF CORRECTION

PATENT NO. : 6,734,977 B2
DATED : May 11, 2004
INVENTOR(S) : Masaaki Noda

It is certified that error appears in the above-identified patent and that said Letters Patent is hereby corrected as shown below:

<u>Title page,</u>
Item [75], Inventors, residence "Suwa (JP)" should be -- Fujimi-cho (JP) --
Item [30], Foreign Application Priority Data, should be -- Nov. 1, 2000 (JP) 2000-334108 Oct. 22, 2001 (JP) 2001-323731 --

<u>Column 1,</u>
Line 18, "entirely" should be -- entirety --
Line 49, "($_e$" should be -- ($n_e$ --
Line 50, "$\zeta$" should be -- $\theta$ --

<u>Column 7,</u>
Line 34, "a" (second occurrence) should be -- an --
Line 48, "liquids" should be -- liquid --

<u>Column 10,</u>
Line 62, "step 54" should be -- step S4 --

<u>Column 11,</u>
Line 11, "54" should be -- S4 --
Line 46, "a" should be -- an --

<u>Column 13,</u>
Line 27, "theses" should be -- these --

<u>Column 14,</u>
Line 30, delete "with"
Line 41, "spring" should be -- spirit --

<u>Column 15,</u>
Line 25, "density" should be -- intensity --

UNITED STATES PATENT AND TRADEMARK OFFICE
CERTIFICATE OF CORRECTION

PATENT NO. : 6,734,977 B2
DATED : May 11, 2004
INVENTOR(S) : Masaaki Noda

It is certified that error appears in the above-identified patent and that said Letters Patent is hereby corrected as shown below:

<u>Column 19,</u>
Lines 24, 34 and 44, after "intensity" insert -- of --

Signed and Sealed this

Second Day of August, 2005

JON W. DUDAS
*Director of the United States Patent and Trademark Office*